United States Patent
Dannebro et al.

(10) Patent No.: US 10,342,054 B2
(45) Date of Patent: Jul. 2, 2019

(54) IP ADDRESS ASSIGNMENT FOR A UE IN 3GPP

(71) Applicant: Telefonaktiebolaget LM Ericsson (publ), Stockholm (SE)

(72) Inventors: Patrik Dannebro, Hisings Kärra (SE); Fredrik Garneij, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 46 days.

(21) Appl. No.: 15/100,791

(22) PCT Filed: Dec. 2, 2013

(86) PCT No.: PCT/EP2013/075201
§ 371 (c)(1),
(2) Date: Jun. 1, 2016

(87) PCT Pub. No.: WO2015/081971
PCT Pub. Date: Jun. 11, 2015

(65) Prior Publication Data
US 2016/0316496 A1    Oct. 27, 2016

(51) Int. Cl.
*H04W 76/11* (2018.01)
*H04L 29/12* (2006.01)
(Continued)

(52) U.S. Cl.
CPC ......... *H04W 76/11* (2018.02); *H04L 61/2007* (2013.01); *H04L 61/6086* (2013.01);
(Continued)

(58) Field of Classification Search
CPC ............. H04L 61/6086; H04L 61/1588; H04L 61/2007; H04L 67/16; H04W 60/00;
(Continued)

(56) References Cited

U.S. PATENT DOCUMENTS 8,566,455 B1 * 10/2013 Zhao ................. H04W 76/15
709/227
9,565,706 B2 * 2/2017 Yue ................... H04W 76/022
(Continued)

FOREIGN PATENT DOCUMENTS

EP    2249522 A1    11/2010

OTHER PUBLICATIONS

"3rd Generation Partnership Project;Technical Specification Group Core Network and Terminals; Non-Access-Stratum (NAS) Protocol for Evolved Packet System (EPS); Stage 3 (Release 12)", 3GPP Standard; 3GPP TS 24.301, 3rd Generation Partnership Project (3GPP), Mobile Competence Centre; 650, Route des Lucioles; F-06921 Sophia-Antipolis Cedex; France, vol. CT WG1, No. V12. 2.0, Sep. 18, 2013, pp. 1-352, XP050712550.
(Continued)

Primary Examiner — Dung B Huynh
(74) Attorney, Agent, or Firm — Rothwell, Figg, Ernst & Manbeck, p.c.

(57) ABSTRACT

A method performed in a user equipment, UE, (1) and a gateway (2) for data communication in a 3GPP network via an access point name, APN, capable of providing support for packet data network, PDN, connectivity using a first internet protocol version and PDN connectivity using a second internet protocol version. The method comprises the steps of the UE requesting (S1) dual stack PDN connectivity from a gateway (2) and receiving (S2) a single IP address on either the first or the second internet protocol version from the gateway (2) and further receiving (S3) from the gateway (2) a cause code indicating that only the assigned PDN and internet protocol version is allowed.

24 Claims, 8 Drawing Sheets

(51) Int. Cl.
*H04L 29/08* (2006.01)
*H04W 76/12* (2018.01)
*H04W 60/00* (2009.01)
*H04W 80/04* (2009.01)
*H04W 76/18* (2018.01)

(52) U.S. Cl.
CPC ............. *H04L 67/16* (2013.01); *H04W 76/12* (2018.02); *H04L 61/1588* (2013.01); *H04W 60/00* (2013.01); *H04W 76/18* (2018.02); *H04W 80/045* (2013.01)

(58) Field of Classification Search
CPC ............. H04W 76/021; H04W 76/022; H04W 76/027; H04W 80/045
See application file for complete search history.

(56) References Cited

U.S. PATENT DOCUMENTS

| | | | | |
|---|---|---|---|---|
| 2008/0254768 A1* | 10/2008 | Faccin | ................. | H04W 76/02 455/411 |
| 2009/0232022 A1* | 9/2009 | Savolainen | ............... | B07B 1/42 370/254 |
| 2009/0290540 A1* | 11/2009 | Cherian | ................. | H04L 47/10 370/328 |
| 2009/0319691 A1* | 12/2009 | Buckley | ............ | H04L 29/12349 709/245 |
| 2010/0027448 A1* | 2/2010 | Puthiyandyil | ....... | H04W 76/025 370/310 |
| 2010/0124198 A1* | 5/2010 | Wong | ................. | H04W 60/005 370/329 |
| 2010/0297979 A1* | 11/2010 | Watfa | ................. | H04W 8/205 455/404.1 |
| 2011/0007671 A1* | 1/2011 | Yu | ....................... | H04L 61/6086 370/255 |
| 2011/0171953 A1* | 7/2011 | Faccin | ................. | H04W 48/08 455/426.1 |
| 2011/0242975 A1* | 10/2011 | Zhao | ................. | H04L 29/12216 370/230 |
| 2012/0082095 A1* | 4/2012 | Sun | ......................... | H04L 61/10 370/328 |
| 2012/0113959 A1* | 5/2012 | Sugizaki | ........... | H04W 36/0016 370/331 |
| 2012/0117257 A1* | 5/2012 | Huo | .................... | H04W 76/022 709/228 |
| 2012/0189016 A1* | 7/2012 | Bakker | ............... | H04W 76/021 370/401 |
| 2012/0202491 A1* | 8/2012 | Fox | ...................... | H04B 7/2609 455/435.1 |
| 2012/0246325 A1* | 9/2012 | Pancorbo Marcos | ........................ | H04L 63/102 709/227 |
| 2012/0327782 A1* | 12/2012 | Tanaka | .................... | H04L 43/50 370/241 |
| 2013/0044679 A1* | 2/2013 | Rathonyi | ............ | H04W 80/045 370/328 |
| 2013/0061058 A1* | 3/2013 | Boivie | .................... | G06F 21/74 713/189 |
| 2013/0107888 A1* | 5/2013 | Guo | .................. | H04W 36/0022 370/401 |
| 2013/0337808 A1* | 12/2013 | Zhao | .................... | H04W 60/00 455/435.3 |
| 2014/0105145 A1* | 4/2014 | Gao | .................... | H04W 84/045 370/329 |
| 2014/0198637 A1* | 7/2014 | Shan | .................. | H04W 52/243 370/229 |
| 2014/0204736 A1* | 7/2014 | Bakker | ............. | H04W 28/0215 370/230 |
| 2014/0211692 A1* | 7/2014 | Delorme | ............... | H04W 48/18 370/328 |
| 2014/0341138 A1* | 11/2014 | Roeland | .............. | H04W 76/021 370/329 |
| 2015/0296445 A1* | 10/2015 | Zhou | ..................... | H04W 48/16 370/328 |
| 2016/0112896 A1* | 4/2016 | Karampatsis | ..... | H04W 28/0252 370/230.1 |

OTHER PUBLICATIONS

"3rd Generation Partnership Project;Technical Specification Group Core Network and Terminals; Mobile radio interface Layer 3 specification; Core network protocols; Stage 3 (Release 8)", 3GPP Standard; 3GPP TS 24.008, 3rd Generation Partnership Project (3GPP), Mobile Competence Centre; 650, Route des Lucioles; F-06921 Sophia-Antipolis Cedex; France, vol. CT WG1, No. V8.19.0, Jun. 24, 2013, pp. 1-593, XP050711752.

International Search Report and Written Opinion dated Jun. 30, 2014 in International application No. PCT/EP2013/075201, 8 pages.

"3rd Generation Partnership Project;Technical Specification Group Services and System Aspects; General Packet Radio (GPRS) enhancements for Evolved Universal Terrestrial Radio Access Network (E-UTRAN) access (Release 11)", 3GPP TS 23.401, V11.5.0 (Mar. 2013), 286 pages.

"3rd Generation Partnership Project;Technical Specification Group Services and System Aspects; General Packet Radio (GPRS) enhancements for Evolved Universal Terrestrial Radio Access Network (E-UTRAN) access (Release 11)", 3GPP TS 23.401, V11.6.0 (Jun. 2013), 286 pages.

"3rd Generation Partnership Project;Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 3GPP TS 29.274, , V11.6.0 (Mar. 2013), 228 pages.

European Communication dated Jul. 11, 2017, issued in European Patent Application No. 13 798 346.6, 6 pages.

\* cited by examiner

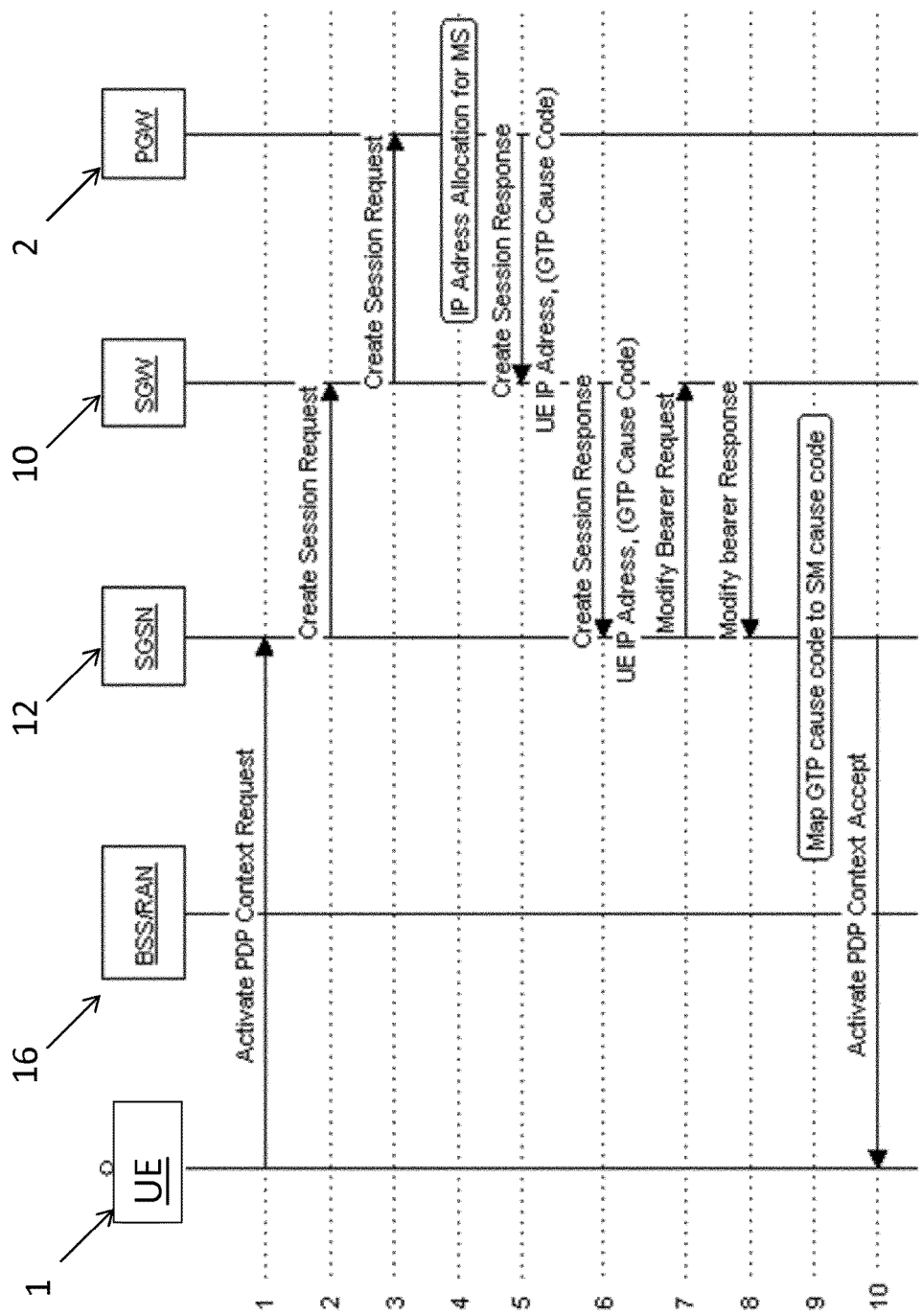

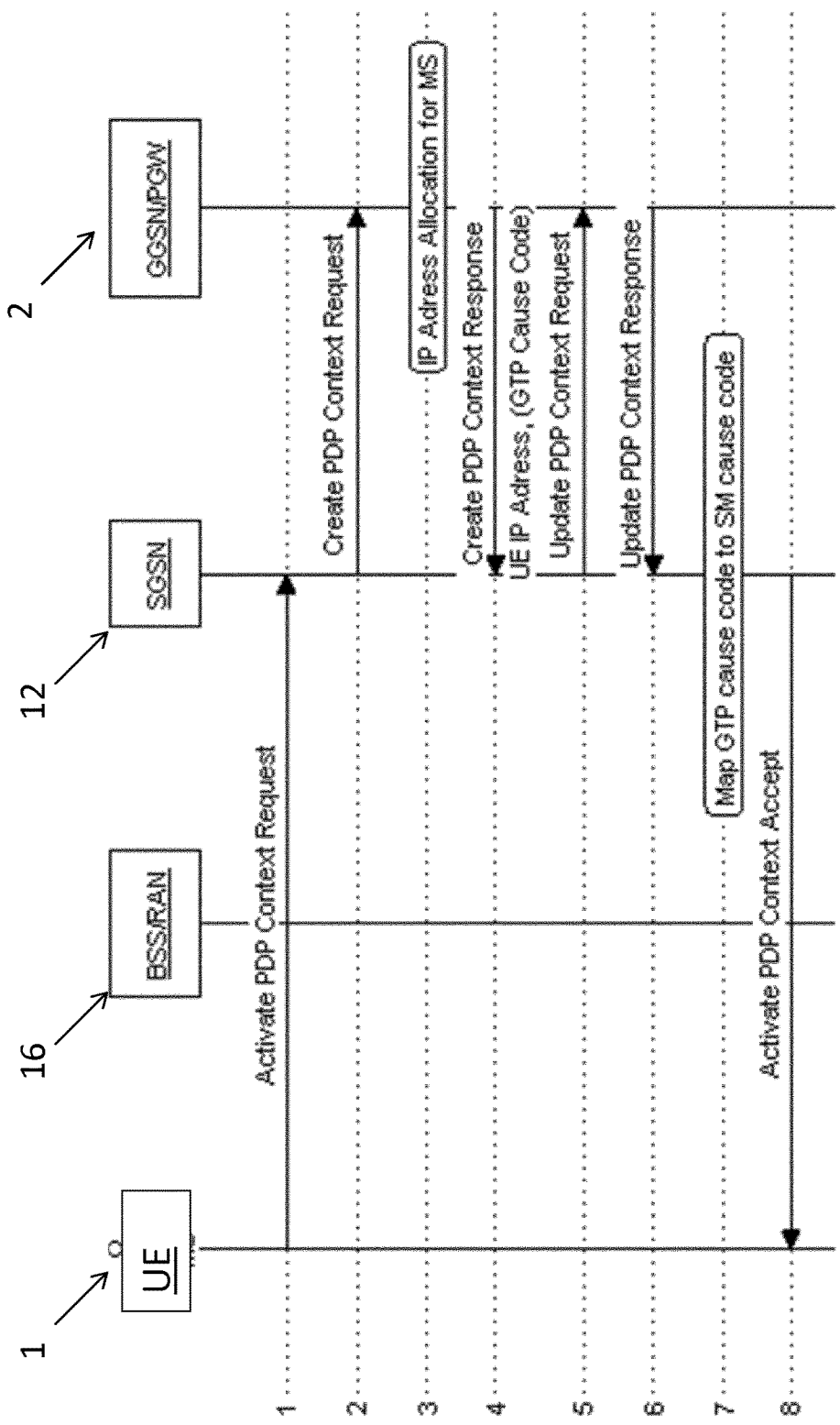

IP ADDRESS ASSIGNMENT FOR A UE IN 3GPP

CROSS-REFERENCE TO RELATED APPLICATION(S)

This application is a 35 U.S.C. § 371 National Phase Entry Application from PCT/EP2013/075201, filed Dec. 2, 2013, and designating the United States.

TECHNICAL FIELD

The present disclosure relates to a method performed in a user equipment, UE, and a gateway for data communication in a 3GPP network via an access point name, APN, capable of providing support for packet data network, PDN, connectivity using a first internet protocol version and PDN connectivity using a second internet protocol version.

BACKGROUND

It is known in 3GPP standard that a User Equipment, UE, may interact with Evolved Packet System, EPS, using the Evolved Universal Terrestrial Radio Access Network, E-UTRAN, radio access. UE related control signaling is handled by Mobility Management Entity, MME, with support of subscription information provided by the Home Subscriber Server, HSS. User payload is handled by the Serving Gateway, S-GW, and the PDN Gateway, PGW. The PGW may interact with a Policy and Charging Rules Function, PCRF.

3GPP Technical Specification TS 23.401, 24.301 and 29.274 elaborate how the UE shall receive it's IP address(es).

It is the PGW that is responsible for allocating and releasing the IP address used by the UE, except in cases where there is a static IP address/prefix stored in the HSS subscription record. In the latter case the PGW uses the IP address/prefix received during the default bearer establishment and delivers it to the UE in the same way as a dynamic IP address.

The UE sets the requested PDN type during an attach or PDN connectivity procedure based on its IP stack configuration, but the PDN type can be modified by the MME based on subscription data received by the HSS and/or operator preferences, and also by the PGW based on operator preferences.

The standard does not allow an operator to restrict the IP address allocated to the UE in all cases. In worst case the UE will end up with double amount of reserved resources in access network, i.e. two default bearers to the same APN, due to lack of operator control and if the standard is followed.

For a general packet radio service, GPRS, system the GPRS support node, GGSN has the same function as the PGW.

SUMMARY

An object of the present disclosure is to provide a method which seeks to mitigate, alleviate, or eliminate one or more of the above-identified deficiencies in the art and disadvantages singly or in any combination and to provide a control of the number of IP-addresses being allocated to a user entity, UE.

This object is obtained by a method performed in a user equipment, UE, for data communication in a 3GPP network via an access point name, APN, capable of providing support for packet data network, PDN, connectivity using a first internet protocol version and PDN connectivity using a second internet protocol version. The UE requests a dual stack PDN connectivity from a gateway. The UE then receives a single IP address on either the first or the second internet protocol version from the gateway and a cause code indicating that only the assigned PDN and internet protocol version is allowed.

One benefit is that the UE will use only one IP address even though the UE is equipped to handle dual stack PDN connectivity. The cause code hinders the UE to send additional requests for a second IP address, which in the present standard referred to in prior art otherwise would be the case.

Since the gateway handles the allocation of IP addresses to and from the UE, different scenarios are applicable for setting up a communication link where a multi stack equipped UE only is allocated one IP address.

According to one aspect the step of requesting dual stack PDN connectivity from the gateway is done during an attach procedure.

According to one aspect the step of requesting dual stack PDN connectivity from the gateway is done during a UE requested PDN connectivity procedure.

According to one aspect the step of requesting dual stack PDN connectivity from the gateway is done during a UE requested PDP context activation procedure.

According to one aspect the method further comprises the step of storing the cause code in the UE. The advantage of storing the cause code is that the UE is satisfied with on IP address and do not ask for a second IP address as long as the cause code is removed or changed. A different cause code could be to allow a dual or multi stack PDN connectivity.

All the above scenarios have the advantage that the gateway has the possibility to identify a dual stack request and to check the status of the UE in order to decide whether to allow a single IP address or more.

It should be noted that further scenarios for establishing a PDN connectivity within the 3GPP standard of today and referred to are possible.

The object stated above is thus also met with a method performed in a gateway for data communication in a 3GPP network via an access point name, APN, capable of providing support for both packet data network, PDN, connectivity using a first internet protocol version and PDN connectivity using a second internet protocol version. The gateway receives a request for dual stack PDN connectivity from the UE. The gateway then checks protocol for IP address allocation. The protocol comprises information to be used by the gateway for deciding whether the UE should be allowed dual stack PDN connectivity or only a single PDN connectivity. When the gateway has decided that the UE shall be allocated only one a single PDN connectivity, the gateway decides a single IP address on either the first or the second internet protocol version based on the protocol for IP address allocation. The gateway then sends the single IP address to the UE and a cause code indicating that only the assigned PDN and internet protocol version is allowed.

As stated above, one benefit is that the UE will use only one IP address even though the UE is equipped to handle dual stack PDN connectivity. The cause code hinders the UE to send additional requests for a second IP address, which in the present standard referred to in prior art otherwise would be the case.

The protocol for IP allocation is based on information that decides whether to allow a dual PDN connectivity or only a single PDN connectivity, i.e. whether to allow one or more IP addresses on the different IP protocols.

According to one aspect, the step of checking protocol for IP address allocation further comprises the step of collecting protocol information from a network regarding the UE.

According to one aspect, the step of checking protocol for IP address allocation further comprises the step of collecting protocol information from an operator or service provider regarding the UE.

The method is not limited to the above mentioned scenarios of collecting information, but further scenarios are possible within the standard of the 3GPP standard herein referred to.

As stated above in connection to the UE there are possible different scenarios for the UE to request dual stack connectivity.

According to one aspect, the step of receiving a request for dual stack PDN connectivity from a UE further comprises the step of receiving a request for dual stack PDN connectivity from the UE during a UE requested attach procedure.

According to one aspect, the step of receiving a request for dual stack PDN connectivity from a UE further comprises the step of receiving a request for dual stack PDN connectivity from the UE during a UE requested PDN connectivity procedure.

According to one aspect, the step of receiving a request for dual stack PDN connectivity from a UE further comprises the step of receiving a request for dual stack PDN connectivity from the UE during a UE requested PDP context activation procedure.

It should be noted that further scenarios for establishing a PDN connectivity within the 3GPP standard of today and referred to are possible.

According to one aspect, the method is performed in a general packet radio service, GPRS, system and the gateway is a gateway GPRS support node, GGSN.

According to another aspect, the method is performed in an evolved packet system, EPS, and the gateway is a packet data network gateway, PGW.

With regard to the allocation of IP addresses, communication with the UE and checking protocol for IP allocation, the GGSN and PGW are similar and perform similar and corresponding functions within each system.

The object stated above is also solved with a UE that performs the method described above. The UE is configured for data communication in a 3GPP network via an access point name, APN, capable of providing support for packet data network, PDN, connectivity using a first internet protocol version and PDN connectivity using a second internet protocol version. The UE comprises a first communication unit being configured to request dual stack PDN connectivity from a gateway. The first communication unit is configured to receive a single IP address on either the first or the second internet protocol version from the gateway. The first communication unit is configured to receive from the gateway a cause code indicating that only the assigned PDN and internet protocol version is allowed.

The advantages stated above are valid also here and the scenarios described below should not be seen as limiting.

According to one aspect, the first communication unit is configured to request dual stack PDN connectivity from the gateway during an attach procedure.

According to one aspect, the first communication unit is configured to request dual stack PDN connectivity from the gateway during a UE requested PDN connectivity procedure.

According to one aspect, the first communication unit is configured to request dual stack PDN connectivity from the gateway org GGSN during a UE requested PDP context activation procedure.

According to one aspect, the UE comprises means for storing the cause code. By way of non-limiting examples, the means for storing the cause code is a tape and/or magnetic disk and/or an optical disc e.g. CD and DVD, and/or addressable semiconductor memory, i.e. integrated circuits consisting of silicon-based transistors which are either volatile or non-volatile.

The object stated above is also solved with a gateway that performs the method described above. The gateway is configured for data communication in a 3GPP network via an access point name, APN, capable of providing support for both packet data network, PDN, connectivity using a first internet protocol version and PDN connectivity using a second internet protocol version. The gateway comprises a second communication unit being configured to receive a request for dual stack PDN connectivity from the UE. The second communication unit is configured to check protocol for IP address allocation. The second communication unit is configured to decide a single IP address on either the first or the second internet protocol version based on the protocol for IP address allocation. The second communication unit is configured to send the single IP address to the UE. The second communication unit is configured to send a cause code indicating that only the assigned PDN and internet protocol version is allowed.

The advantages stated above are valid also here and the scenarios described below should not be seen as limiting.

According to one aspect, the second communication unit is configured to perform the step of checking protocol for IP address allocation by collecting protocol information from a network regarding the UE.

According to one aspect, the second communication unit is configured to perform the step of checking protocol for IP address allocation by collecting protocol information from an operator or service provider regarding the UE.

According to one aspect, the second communication unit is configured to perform the step of receiving a request for dual stack PDN connectivity from a UE by receiving a request for dual stack PDN connectivity from the UE during a UE requested attach procedure.

According to one aspect, the second communication unit is configured to perform the step of receiving a request for dual stack PDN connectivity from a UE by receiving a request for dual stack PDN connectivity from the UE during a UE requested PDN connectivity procedure.

According to one aspect, the second communication unit is configured to perform the step of receiving a request for dual stack PDN connectivity from a UE by receiving a request for dual stack PDN connectivity from the UE during a UE requested PDP context activation procedure.

According to one aspect the gateway is a gateway GPRS support node, GGSN, in a general packet radio service, GPRS, system.

According to another aspect the gateway is a packet data network gateway, PGW in an evolved packet system, EPS.

With reference to the method and devices for the UE and the gateway according to the above the first internet protocol is version four, IPv4 and/or wherein the second internet protocol being version six, IPv6. The current 3GPP standard herein referred to only mentions IPv4 and IPv6, but names could change. The method of giving the UE a single IP address and a cause code hindering further PDN connectivity is valid also during such changes.

By way of non-limiting example, the UE is a telephone, tablet, computer, or any other unit capable of data packet communication according to 3GPP.

The first and/or second communication units are any unit or composition of units that has the capacity to transmit, receive and compute packet data. The first and/or second communication units comprises a processor and a memory, said memory containing instructions executable by said processor, whereby said first and/or second communication unit is operable to the above mentioned method steps.

It should be noted that in 3GPP both UE and MS are mentioned as a user equipment, but they refer to the same entity.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which:

FIG. 7 schematically shows a flowchart for a PDP Context process in EPS, and in which;

FIG. 8 schematically shows a flowchart for a PDP Context process in GPRS

DETAILED DESCRIPTION

Figure 1:
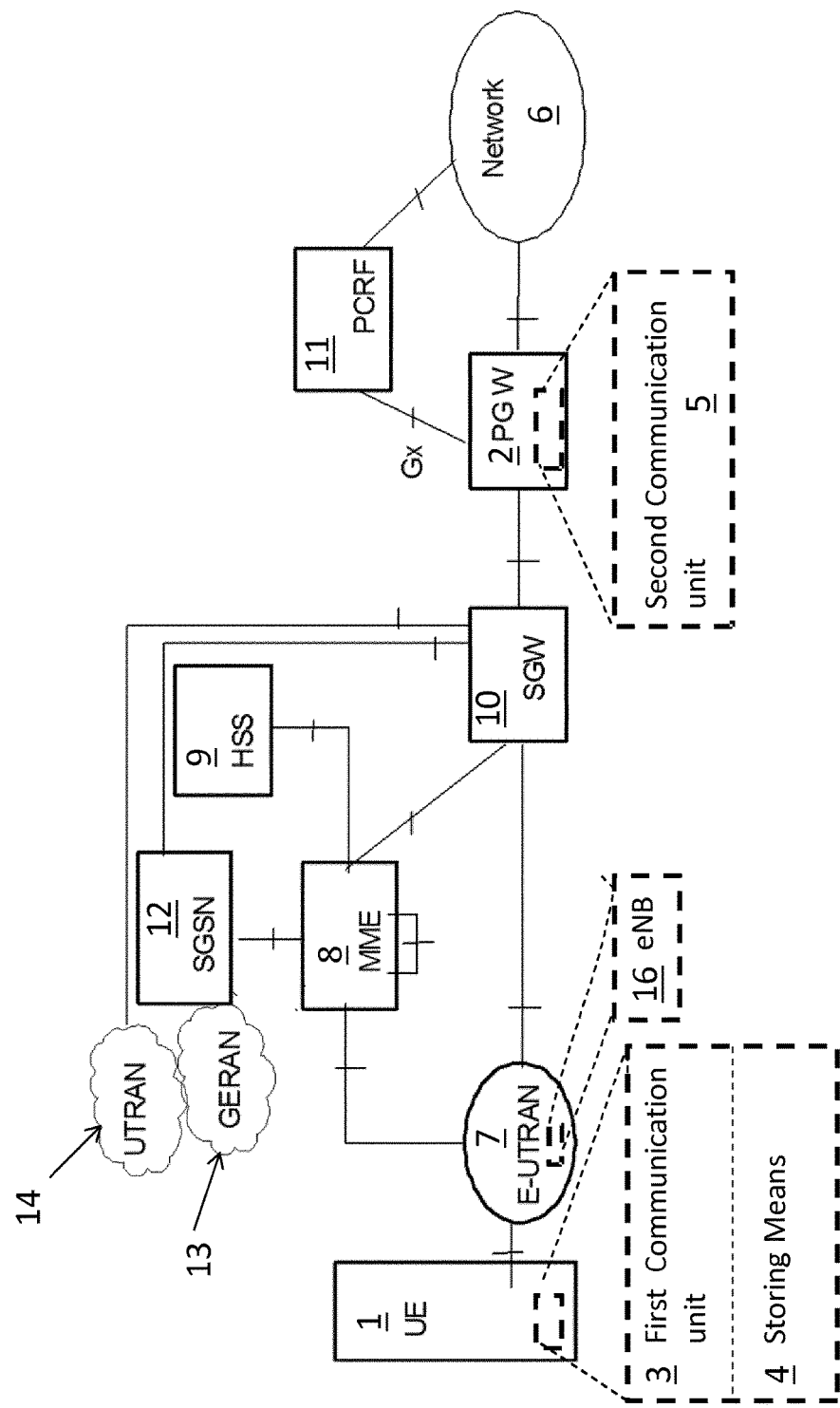
FIG. 1 schematically shows an evolved packet system, EPS.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

FIG. 1 shows a user equipment, UE, 1 and a gateway 2 that handles IP packet allocation for the UE 1. The UE 1 is a unit that is capable of communicating with packet data within 3GPP. The UE 1 comprises a first communication unit 3 that performs certain tasks for the UE. The tasks will be described further below in connection to the appended drawings. The UE 1 comprises storing means 4 for storing information from the gateway 2. The gateway 2 comprises a second communication unit 5 that performs certain tasks for the gateway 2. The tasks will be described further below in connection to the appended drawings. The gateway 2 is responsible for communication with a network 6 comprising services from one or several operators, e.g. IP Multimedia Subsystem, IMS, Packet-switched Streaming Service, PSS. The network 6 could be the Internet or any similar system.

FIG. 1 schematically shows that the gateway 2 is a packet data network gateway, PGW, 2 in an evolved packet system, EPS.

Figure 2:
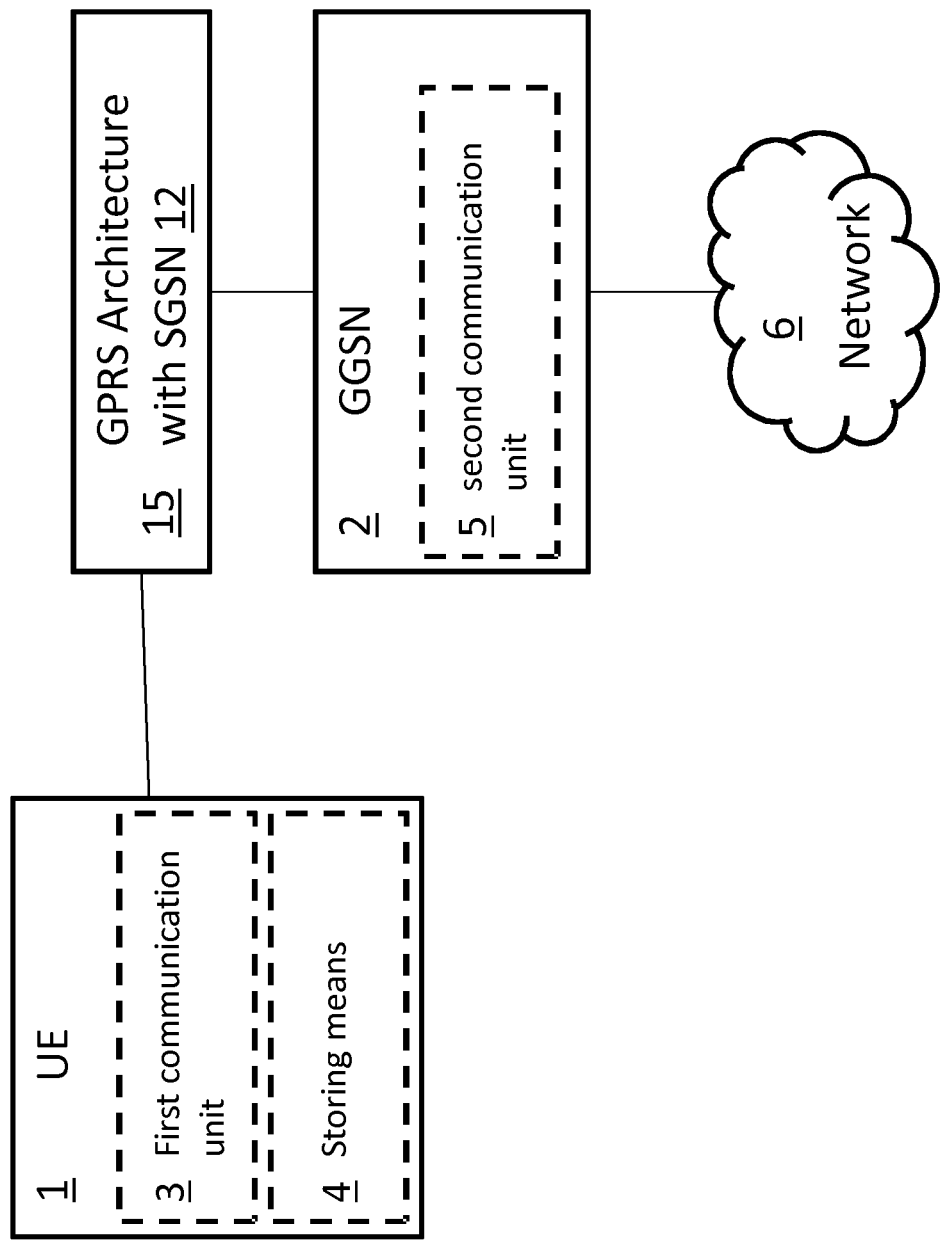
FIG. 2 schematically shows a general packet radio service, GPRS, system.

FIG. 2 schematically shows that the gateway 2 is a gateway GPRS support node, GGSN, 2 in a general packet radio service, GPRS, system. The GPRS system will not be explained in detailed since it is as known as EPS in its architecture. FIG. 2 therefore shows the GPRS architecture with a box 15. FIG. 2 shows a UE1 comprising a first communication unit 3 and a storing means 4. The gateway 2, i.e. the GGSN, comprises the second communication unit 5. The GGSN 2 is connected to the network 6 and the GPRS architecture 15 for data packet communication within the 3GPP standard herein referred to.

The method for the UE 1 and the gateway 2 described below is valid in both the EPS and the GPRS systems.

By way of non-limiting example, the UE is a telephone, tablet, computer, or any other unit capable of data packet communication according to 3GPP.

The first and second communication 3, 5 units are any unit or composition of units that has the capacity to transmit, receive and compute packet data.

FIG. 1 schematically shows a non-roaming architecture for evolved packet system, EPS according to prior art.

In FIG. 1, the UE 1 interacts with the EPS using Evolved Universal Terrestrial Radio Access Network, E-UTRAN, 7 radio access. UE 1 related control signaling is handled by a Mobility Management Entity, MME, 8 with support of subscription information provided by a Home Subscriber Server, HSS, 9. User payload is handled by the Serving Gateway, SGW, 10 and the gateway 2 being a PDN Gateway, PGW 2. The PGW 2 has the capability of interacting with a Policy and Charging Rules Function, PCRF 11.

It is the PGW 2 that is responsible for allocating and releasing the IP address used by the UE 1, except in cases where there is a static IP address/prefix stored in the HSS 9 subscription record. In the latter case the PGW 2 uses the IP address/prefix received during the default bearer establishment and delivers it to the UE 1 in the same way as a dynamic IP address.

The UE 1 sets the requested PDN type during an Attach or PDN Connectivity Procedure based on its IP stack configuration, but the PDN type can be modified by the MME 8 based on subscription data received by the HSS 9 and/or operator preferences, and also by the PGW 2 based on operator preferences.

3GPP Technical Specification (TS) 23.401, 24.301 and 29.274 elaborate how the UE shall receive it's IP address(es).

The standard does not allow an operator to restrict the IP address allocated to the UE 1 in all cases. The operator can restrict the allowed PDN-type based on International Mobile Subscriber Identity, IMSI, in the subscription profile, or based on PGW 2 configuration, but not related to physical UE 1 and International Mobile Equipment Identity, IMEI (SV), i.e. UE low level IP stack capabilities. In worst case the UE 1 will end up with double amount of reserved resources in access network, i.e. two default bearers to the same APN, due to lack of operator control and if the standard is followed.

Further, the HSS is always located in the Home Public Land Mobile Network, HPLMN, where the Visited Public Land Mobile Network, VPLMN, operator does not have control of the subscription data, while the PGW 2 may exist in the VPLMN.

TS 23.401 section 5.3.1.1 includes the following specification for IP address allocation:

"The way that the UE 1 sets the requested PDN type may be pre-configured in the UE 1 per APN. Unless otherwise configured, including when the UE 1 does not send any APN, the UE 1 sets the PDN type during the Attach or PDN Connectivity procedures based on its IP, stack configuration as follows:

A UE 1 which is IPv6 and IPv4 capable shall request for PDN type IPv4v6.

A UE 1 which is only IPv4 capable shall request for PDN type IPv4.

A UE 1 which is only IPv6 capable shall request for PDN type IPv6.

When the IP version capability of the UE 1 is unknown in the UE 1 (as in the case when the MT and TE are separated and the capability of the TE is not known in the MT), the UE 1 shall request for PDN type IPv4v6.

NOTE 1: At intersystem changes between GSM EDGE Radio Access Network, GERAN, 13/Universal Terrestrial Radio Access Network, UTRAN, 14 and E-UTRAN 7 there is a 1-to-1 mapping between PDP type IPv4v6 and PDN type IPv4v6 without re-negotiation of the PDP/PDN type used for a PDN connection.

The HSS stores one or more PDN types per APN in the subscription data. During the Attach or UE 1 requested PDN connectivity procedure the MME compares the requested PDN type to the PDN type in the subscription records for the given APN and sets the PDN type as follows:

If the requested PDN type is allowed by subscription, the MME sets the PDN type as requested.

If the requested PDN type is IPv4v6 and subscription data only allows PDN type IPv4 or only allows PDN type IPv6, the MME sets the PDN type according to the subscribed value. A reason cause shall be returned to the UE 1 indicating that only the assigned PDN type is allowed. In this case the UE 1 shall not request another PDN connection to the same APN for the other IP version.

If the requested PDN type is IPv4 or IPv6, and either the requested PDN type or PDN type IPv4v6 are subscribed, the MME sets the PDN type as requested. Otherwise the PDN connection request is rejected.

If the requested PDN type is IPv4v6, and both IPv4 and IPv6 PDN types are allowed by subscription but not IPv4v6, the MME shall set the PDN type to IPv4 or IPv6 where the selection between IPv4 and IPv6 is implementation specific. The UE 1 should then initiate the UE 1 requested PDN connectivity procedure to this APN in order to activate a second PDN connection with the other single address PDN type which was not allocated by the network.

NOTE 2: If the MT and TE are separated, the UE 1 might not be able to use reason cause "single address bearers only" as a trigger for activating a second single-stack EPS bearer.

The PDN GW may restrict the usage of a PDN type IPv4v6 as follows.

If the PDN GW receives a request for PDN type IPv4v6, but the PDN GW operator preferences dictate the use of IPv4 addressing only or IPv6 prefix only for this APN, the PDN type shall be changed to a single address PDN type (IPv4 or IPv6) and a reason cause shall be returned to the UE 1 indicating that only the assigned PDN type is allowed. In this case the UE 1 shall not request another PDN connection to the same APN for the other IP version.

If the PDN GW receives a request for PDN type IPv4v6, but the MME does not set the Dual Address Bearer Flag due to the MME operator using single addressing per bearer to support interworking with nodes of earlier releases the PDN type shall be changed to a single IP version only and a reason cause shall be returned to the UE 1 indicating that only single IP version per PDN connection is allowed. In this case the UE 1 should request another PDN connection for the other IP version using the UE 1 requested PDN connectivity procedure to the same APN with a single address PDN type (IPv4 or IPv6) other than the one already activated."

And further elaborated in details in TS 24.301 section 6.2.2:

"The UE 1 shall set the PDN type IE in the PDN CONNECTIVITY REQUEST message, based on its IP stack configuration (e.g. the per APN settings specified in 3GPP TS 23.401 [10]) as follows:

a) A UE, which is IPv6 and IPv4 capable and has not been allocated an IP address for this APN, shall set the PDN type IE to IPv4v6.

has been allocated an IPv4 address for this APN and received the ESM cause #52 "single address bearers only allowed", and is requesting an IPv6 address, shall set the PDN type IE to IPv6.

has been allocated an IPv6 address for this APN and received the ESM cause #52 "single address bearers only allowed", and is requesting an IPv4 address, shall set the PDN type IE to IPv4.

b) A UE, which is only IPv4 capable, shall set the PDN type IE to IPv4.

c) A UE, which is only IPv6 capable, shall set the PDN type IE to IPv6.

d) When the IP version capability of the UE 1 is unknown in the UE 1, as in the case when the UE/MS is split into a mobile terminal, MT, and Terminal Equipment, TE, and where the MT and TE are separated and the capability of the TE is not known in the MT, the UE shall set the PDN type IE to IPv4v6.

If the UE 1 wants to use DHCPv4 for IPv4 address assignment, it shall indicate that to the network within the Protocol Configuration Options IE in the PDN CONNECTIVITY REQUEST.

On receipt of the PDN CONNECTIVITY REQUEST message sent by the UE, the network when allocating an IP address shall take into account the PDN type IE, the operator policies of the home and visited network, and the user's subscription data.

- If the UE 1 requests for PDN type IPv4v6, but the subscription is limited to IPv4 only or IPv6 only for the requested APN, the network shall override the PDN type requested by the UE to be limited to a single address PDN type (IPv4 or IPv6). In the ACTIVATE DEFAULT EPS BEARER CONTEXT REQUEST message sent to the UE, the network shall set the PDN type value to either IPv4 or IPv6 and the ESM cause value to #50 "PDN type IPv4 only allowed", or #51 "PDN type IPv6 only allowed", respectively. The UE 1 shall not subsequently initiate another UE 1 requested PDN connectivity procedure to the same APN to obtain a PDN type different from the one allowed by the network.
- If the UE 1 requests PDN type IPv4v6, but the PDN GW configuration dictates the use of IPv4 addressing only or IPv6 addressing only for this APN, the network shall override the PDN type requested by the UE 1 to limit it to a single address PDN type (IPv4 or IPv6). In the ACTIVATE DEFAULT EPS BEARER CONTEXT REQUEST message sent to the UE, the network shall set the PDN type value to either IPv4 or IPv6 and the ESM cause value to #50 "PDN type IPv4 only allowed", or #51 "PDN type IPv6 only allowed", respectively. The UE 1 shall not subsequently initiate another UE 1 requested PDN connectivity procedure to the same APN to obtain a PDN type different from the one allowed by the network.
- If the UE 1 requests PDN type IPv4v6, but the operator uses single addressing per bearer, e.g. due to interworking with nodes of earlier releases, the network shall override the PDN type requested by the UE 1 to a single IP version only. In the ACTIVATE DEFAULT EPS BEARER CONTEXT REQUEST message sent to the UE, the network shall set the PDN type value to either "IPv4" or "IPv6" and the ESM cause value to #52 "single address bearers only allowed". The UE 1 should subsequently request another PDN connection for the other IP version using the UE 1 requested PDN connectivity procedure to the same APN with a single address PDN type, IPv4 or IPv6, other than the one already activated.

NOTE: If the MT and TE are separated the UE 1 might not be able to use ESM cause #52 "single address bearers only allowed" as a trigger for activating a second single-IP-stack EPS bearer context."

And in 3GPP TS 29.274 definitions for cause codes:

"As specified in sub-clause 5.3.1.1 in 3GPP TS 23.401 [3] and sub-clause 9.2.1 in 3GPP TS 23.060 [35], the cause value "New PDN type due to network preference" indicates that the UE 1 has requested PDN type IPv4v6 and only IPv4 or IPv6 address is allowed for the PDN based on PGW 2 operator policy.

As specified in sub-clause 5.3.1.1 in 3GPP TS 23.401 [3] and sub-clause 9.2.1 in 3GPP TS 23.060 [35], the cause value "New PDN type due to single address bearer only" indicates that the UE has requested PDN type IPv4v6 and both IPv4 and IPv6 addressing is possible in the PDN but the Dual Address Bearer Flag of the Indication IE is set to 0 or the Indication IE is absent, or only single IP version addressing is possible in the PDN."

An operator without control of all three parts: UE capabilities, subscription data and PGW 2 APN configuration cannot restrict a UE 1 to only use one IP type for an APN. UE capabilities may be unknown to the operator, as well as subscription data. Scenarios where this is beneficial is in walled garden scenarios where the operator has full control of the network accessed behind the PGW 2 and only want to give one IP address to the UE 1 for this APN and only use one PDN connection.

EXAMPLES

1. PGW 2: If UE 1 requests PDN type IPv4v6, e.g. as mandated by GSMA IR.92 for Voice over LTE, VoLTE, subscription data may limit this to either a Ipv4 only, a IPv6 only, a IPv4 or IPv6 or allow IPv4v6. Since PGW 2 operator may be unaware of the subscription data from HPLMN the operator cannot proactively configure the APN on PGW 2 for either IPv4 only or IPv6 only, but must use only single IP version addressing for this APN IPv4 and IPv6. If the UE 1 requested a dual stack address, not limited in subscription data to IPv4 only or IPv6 only, it will subsequently request another PDN connection to this APN.

2. HSS: An operator cannot limit the subscription data to IPv4" only or IPv6 only since the operator may be unaware of the UE 1 capabilities and also the PGW 2 configuration in VPLMN. Only possibility is to use PDN type IPv4 or IPv6 or IPv4v6 to cover all possible combinations of UE 1 capabilities and PGW 2 configuration. If the UE 1 requested a dual stack address, not limited in PGW 2 configuration to IPv4 only or IPv6 only but rather IPv6 or IPv4, it will subsequently request anther PDN connection to this APN.

FIG. 1 also shows E-UTRAN Node B, also known as Evolved Node B, abbreviated as eNodeB or eNB 16 which is the hardware that is connected to the UE 1 network and that communicates directly with mobile units, like a base transceiver station, BTS in Global Systems for Mobiles, GSM, networks.

To sum up with regard to FIG. 1 and the current 3GPP standard:

According to prior art: If the UE 1 has requested a dual stack PDN connectivity, and the PGW 2 is configured to support both Ipv4 and Ipv6 but using single address bearers only OR the UE 1 has requested a dual stack PDN connectivity and the MME 8 has not set dual address bearer flag and the APN is configured to support both IPv4 and IPv6 using dual stack bearer or single address bearers, the PDN GW responds with an allocated IP address, based on preferences, and a GTP cause code that equals #19 "New PDN Type due to single address bearer only". This cause code and allocated IP address is transferred through the SGW 10 to the MME 8. The MME 8 maps the GTP cause code to a NAS cause code according 3GPP TS 29.274 to #52 "single address bearer only allowed". In this case the UE/MS should request an additional PDN connection to the same APN to retrieve the missing IP address.

According to the claimed method: If the UE 1 has requested a dual stack PDN connectivity, and the PGW is configured to support both Ipv4 and Ipv6 but using single address bearers only OR the UE has requested a dual stack PDN connectivity and the MME 8 has not set dual address bearer flag and the APN is configured to support both IPv4 and IPv6 using dual stack bearer or single address bearers, the PGW 2 responds with an allocated IP address, based on preferences, and a GTP cause code that equals #18 "New PDN Type due to network preference". This cause code and allocated IP address is transferred through the SGW to the MME 8. The MME 8 maps the GTP cause code to a NAS cause code according 3GPP TS 29.274 to either #51 "PDN Type IPv6 only allowed" or #50 "PDN type IPv4 only allowed". The actual NAS cause sent to the UE 1 depends on the allocated IP address type. In this case the UE 1 shall not request an additional PDN connection to the same APN to retrieve the missing IP address.

FIG. 1 is valid for MME and S4-SGSN connecting to a Serving GW even if only MME is mentioned.

To sum up with regard to FIG. 2 and the current 3GPP standard:

According to prior art: If the UE 1 has requested a dual stack PDN connectivity, and the GGSN 2 is configured to support both Ipv4 and Ipv6 but using single address bearers only OR the UE has requested a dual stack PDN connectivity and the SGSN 12 has not set dual address bearer flag and the APN is configured to support both IPv4 and IPv6 using dual stack bearer or single address bearers, the GGSN 12 responds with an allocated IP address, based on preferences, and a GTP cause code that equals #130 "New PDP Type due to single address bearer only". This cause code and allocated IP address is transferred to the SGSN 12. The SGSN 12 maps the GTP cause code to a NAS cause code according 29.060 to #52 "single address bearer only allowed". In this case the UE 1 should request an additional PDN connection to the same APN to retrieve the missing IP address.

According to the claimed method: If the UE 1 has requested a dual stack PDN connectivity, and the GGSN is configured to support both Ipv4 and Ipv6 but using single address bearers only OR the UE 1 has requested a dual stack PDN connectivity and the SGSN 12 has not set dual address bearer flag and the APN is configured to support both IPv4 and IPv6 using dual stack bearer or single address bearers, the GGSN responds with an allocated IP address, based on preferences, and a GTP cause code that equals #129 "New PDP Type due to network preference". This cause code and allocated IP address is transferred to the SGSN. The SGSN maps the GTP cause code to a NAS cause code according 29.060 to either #51 "PDN Type IPv6 only allowed" or #50 "PDN type IPv4 only allowed". The actual NAS cause sent to the UE 1 depends on the allocated IP address typ. In this case the UE 1 shall not request an additional PDN connection to the same APN to retrieve the missing IP address.

FIG. 2 is valid for SGSN 12 connecting to GGSN 2 or Gn-PGW even if only GGSN 2 is mentioned.

Figure 3:
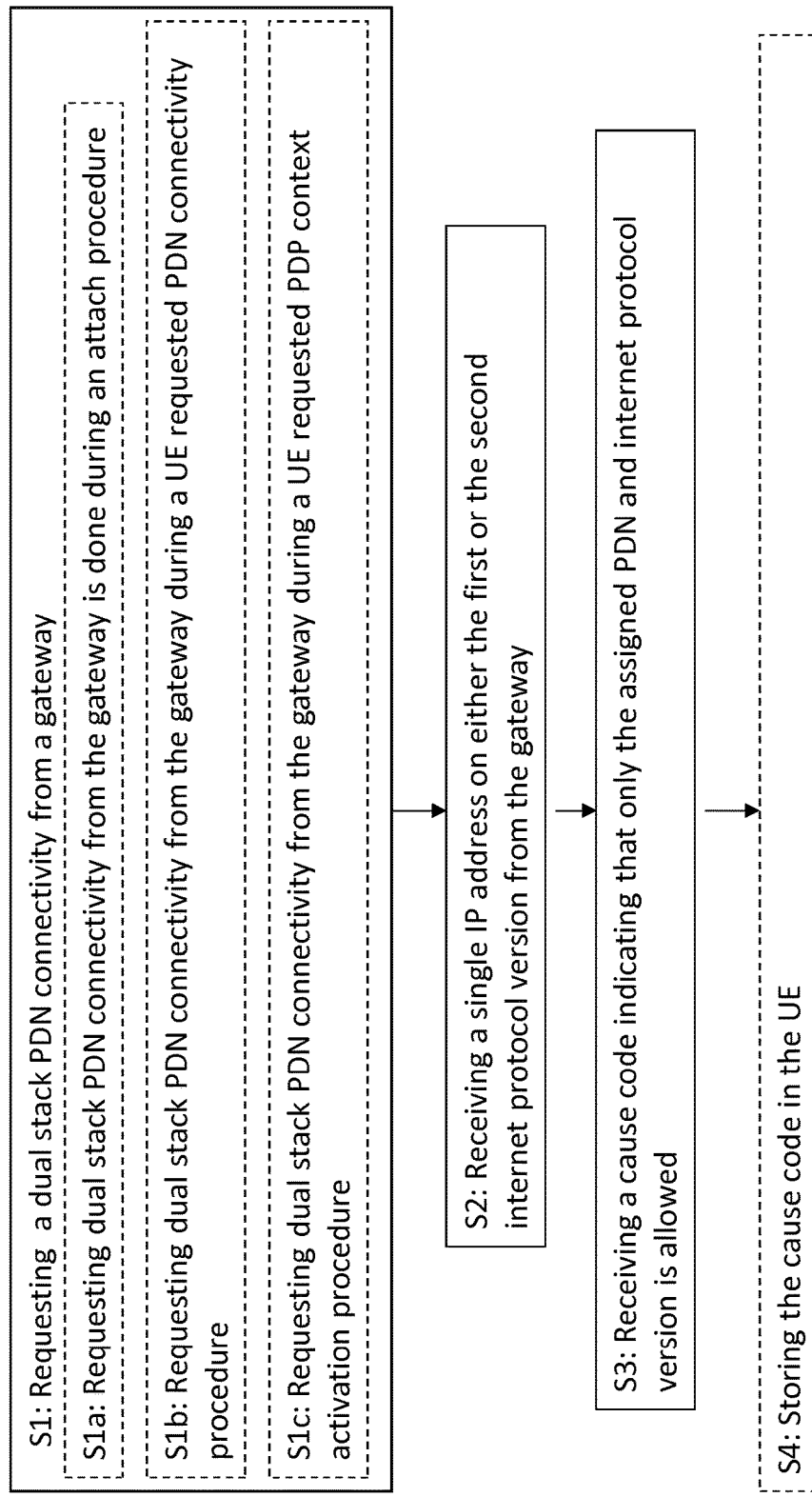
FIG. 3 shows a flow chart illustrating embodiments of method steps, performed in a UE.

FIG. 3 shows a flow chart illustrating embodiments of method steps, performed in the UE. The UE 1 is configured for data communication in a 3GPP network via an access point name, APN, capable of providing support for packet data network, PDN, connectivity using a first internet protocol version and PDN connectivity using a second internet protocol version. The UE 1 requests S1 a dual stack PDN connectivity from the gateway 2. The UE 1 then receives S2 a single IP address on either the first or the second internet protocol version from the gateway 2 and receives S3 a cause code indicating that only the assigned PDN and internet protocol version is allowed.

One benefit is that the UE 1 will use only one IP address even though the UE 1 is equipped to handle dual stack PDN connectivity. The cause code hinders the UE 1 to send additional requests for a second IP address, which in the present standard referred to in prior art otherwise would be the case.

Since the gateway 2 handles the allocation of IP addresses to and from the UE, different scenarios are applicable for setting up a communication link where a multi stack equipped UE 1 only is allocated one IP address.

According to one aspect the step of requesting S1 dual stack PDN connectivity from the gateway 2 is requested S1a during an attach procedure.

According to one aspect the step of requesting dual stack PDN connectivity from the gateway 2 is requested s1b during a UE 1 requested PDN connectivity procedure.

According to one aspect the step of requesting dual stack PDN connectivity from the gateway 2 is requested S1c during a UE 1 requested PDP context activation procedure.

According to one aspect the method further comprises the step of storing S4 the cause code in the UE. The advantage of storing the cause code is that the UE 1 is satisfied with on IP address and do not ask for a second IP address as long as the cause code is removed or changed. A different cause code could be to allow a dual or multi stack PDN connectivity.

All the above scenarios have the advantage that the gateway 2 has the possibility to identify a dual stack request and to check the status of the UE 1 in order to decide whether to allow a single IP address or more.

It should be noted that further scenarios for establishing a PDN connectivity within the 3GPP standard of today and referred to are possible.

Figure 4:
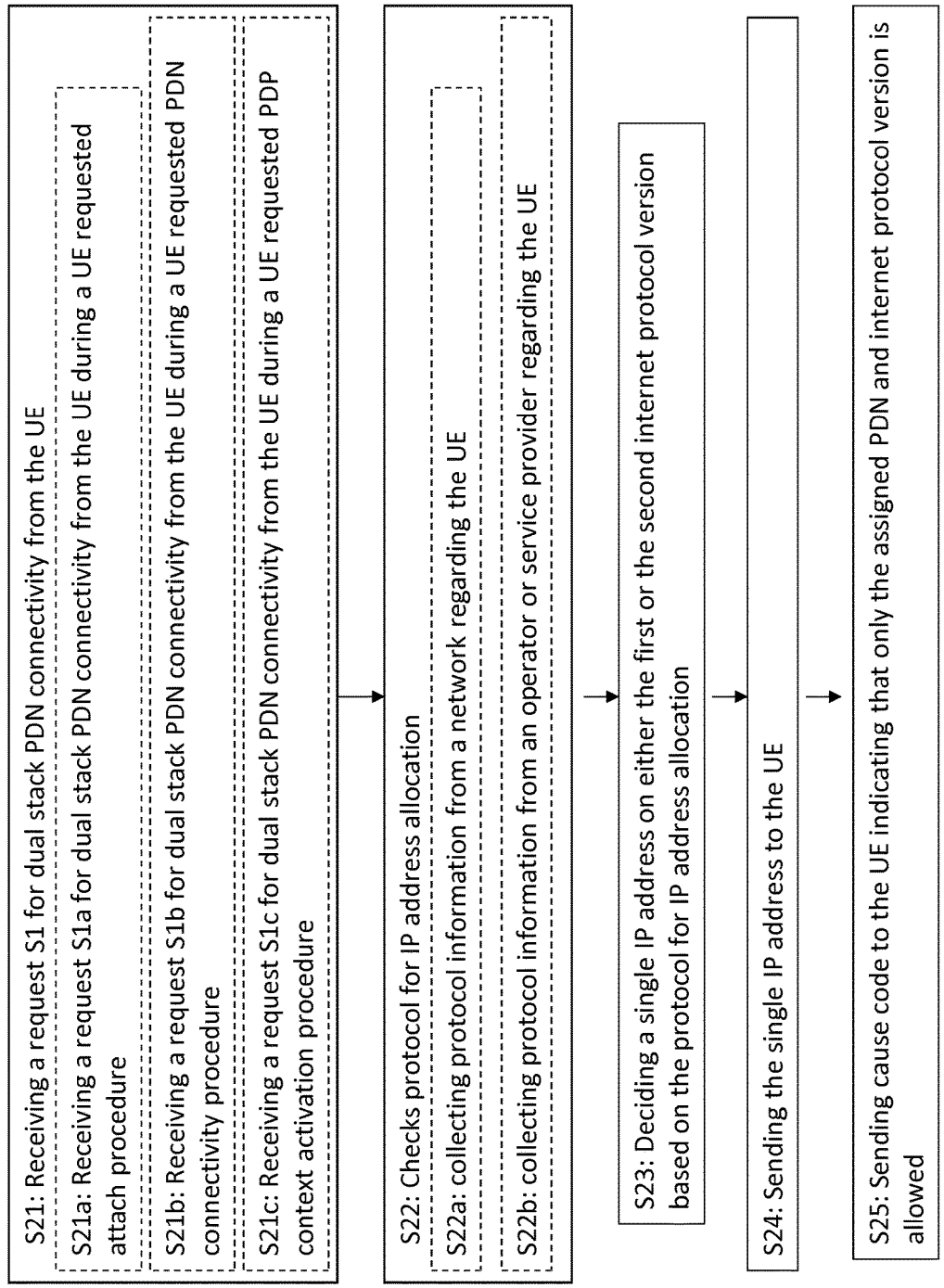
FIG. 4 shows a flow chart illustrating embodiments of method steps, performed in a gateway.

FIG. 4 shows a flow chart illustrating embodiments of method steps, performed in the gateway 2. The gateway 2 is configured for data communication in a 3GPP network via an access point name, APN, capable of providing support for both packet data network, PDN, connectivity using a first internet protocol version and PDN connectivity using a second internet protocol version. The gateway 2 receives S21 a request S1 for dual stack PDN connectivity from the UE. The gateway 2 then checks S22 protocol for IP address allocation. The protocol comprises information to be used by the gateway 2 for deciding whether the UE 1 should be allowed dual stack PDN connectivity or only a single PDN connectivity. When the gateway 2 has decided that the UE 1 shall be allocated only one a single PDN connectivity, the gateway 2 decides S23 a single IP address on either the first or the second internet protocol version based on the protocol for IP address allocation. The gateway 2 then sends S24 the single IP address to the UE 1 and sends S25 cause code indicating that only the assigned PDN and internet protocol version is allowed.

As stated above, one benefit is that the UE 1 will use only one IP address even though the UE 1 is equipped to handle dual stack PDN connectivity. The cause code hinders the UE 1 to send additional requests for a second IP address, which in the present standard referred to in prior art otherwise would be the case.

The protocol for IP allocation is based on information that decides whether to allow a dual PDN connectivity or only a single PDN connectivity, i.e. whether to allow one or more IP addresses on the different IP protocols.

According to one aspect, the step of checking S22 protocol for IP address allocation further comprises the step of collecting S22a protocol information from a network regarding the UE.

According to one aspect, the step of checking S22 protocol for IP address allocation further comprises the step of collecting S22b protocol information from an operator or service provider regarding the UE.

By way of non-limiting example, information for decision on IP version based on external sources, i.e. information that is explicitly requested or contained in existing and future session setup procedures, includes:
- Information received by the gateway 2 from Accounting, Authorization and Authentication, AAA-server using radius or diameter
- Information received by the gateway 2 from PCRF during Gx session establishment
- Information received by the gateway 2 during the session set-up procedures, e.g. IMSI, IMEI/IMEISV, PLMNID, location information, roaming status, RAT Type etc. All acronyms are well known within the 3GPP standard.

The method is not limited to the above mentioned scenarios of collecting information, but further scenarios are possible within the standard of the 3GPP standard herein referred to.

As stated above in connection to the UE 1 there are possible different scenarios for the UE 1 to request dual stack connectivity.

According to one aspect, the step of receiving S21 a request S1 for dual stack PDN connectivity from a UE 1 further comprises the step of receiving S21a a request S1a for dual stack PDN connectivity from the UE 1 during a UE 1 requested attach procedure.

According to one aspect, the step of receiving S21 a request for dual stack PDN connectivity from a UE 1 further comprises the step of receiving S21b a request S1b for dual stack PDN connectivity from the UE 1 during a UE 1 requested PDN connectivity procedure.

According to one aspect, the step of receiving S21 a request S1 for dual stack PDN connectivity from a UE 1 further comprises the step of receiving S21c a request S1c for dual stack PDN connectivity from the UE 1 during a UE 1 requested PDP context activation procedure.

It should be noted that further scenarios for establishing a PDN connectivity within the 3GPP standard of today and referred to are possible.

According to one aspect, the method is performed in a general packet radio service, GPRS, system and the gateway 2 is a gateway GPRS support node, GGSN.

According to another aspect, the method is performed in an evolved packet system, EPS, and the gateway 2 is a packet data network gateway, PGW 2.

With regard to the allocation of IP addresses, communication with the UE 1 and checking protocol for IP allocation, the GGSN and PGW 2 are similar and perform similar and corresponding functions within each system.

With reference to the method and devices for the UE 1 and the gateway 2 according to the above the first internet protocol is version four, IPv4 and/or wherein the second internet protocol being version six, IPv6. The current 3GPP standard herein referred to only mentions IPv4 and IPv6, but names could change. The method of giving the UE 1 a single IP address and a cause code hindering further PDN connectivity is valid also during such changes.

Figure 5:
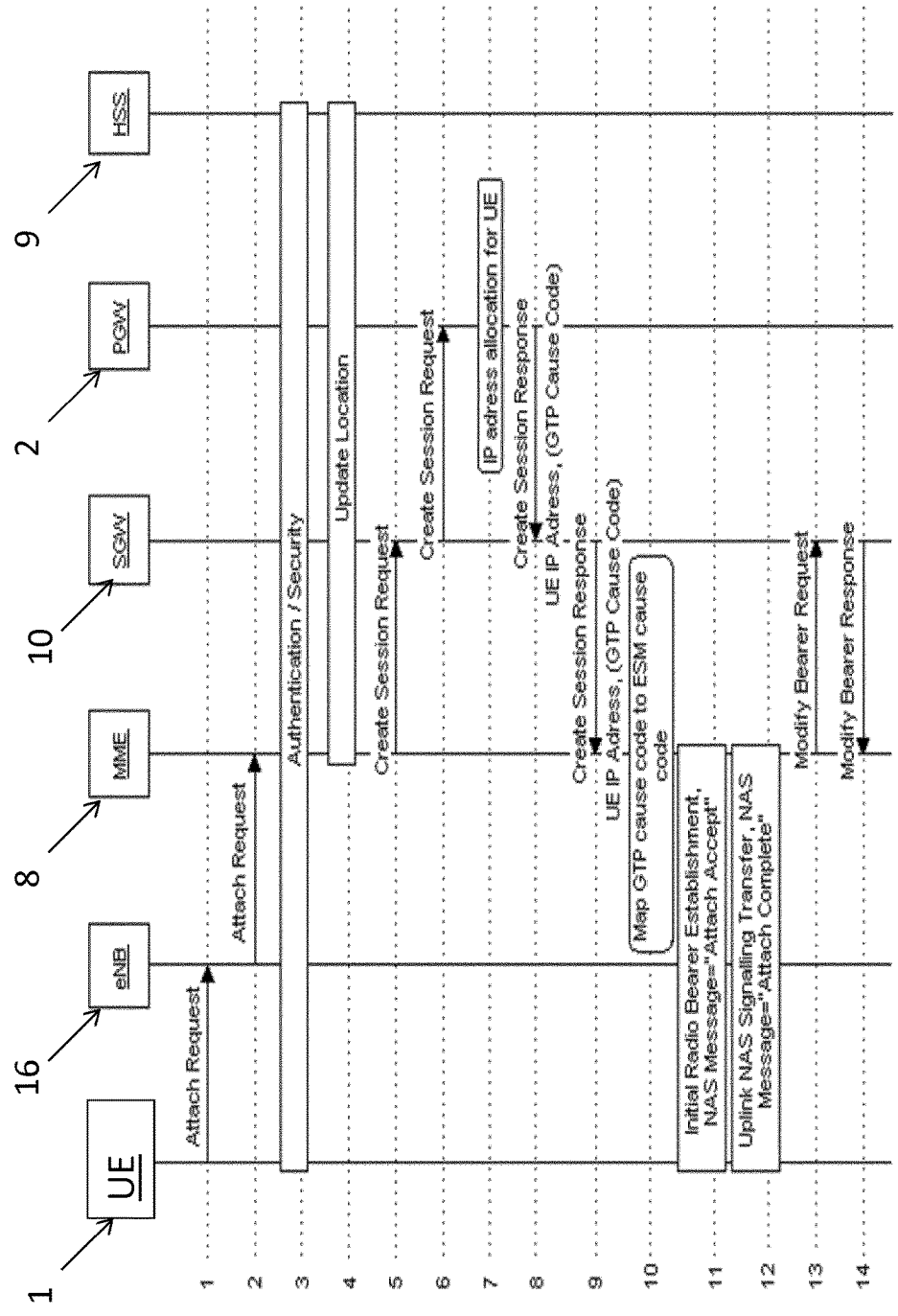
FIG. 5 shows a flowchart of a simplified version of the E-UTRAN Initial Attach sequence from 3GPP TS 23.401.

The flowchart in FIG. 5 is a simplified version of the E-UTRAN Initial Attach sequence from 3GPP TS 23.401.

Figure 6:
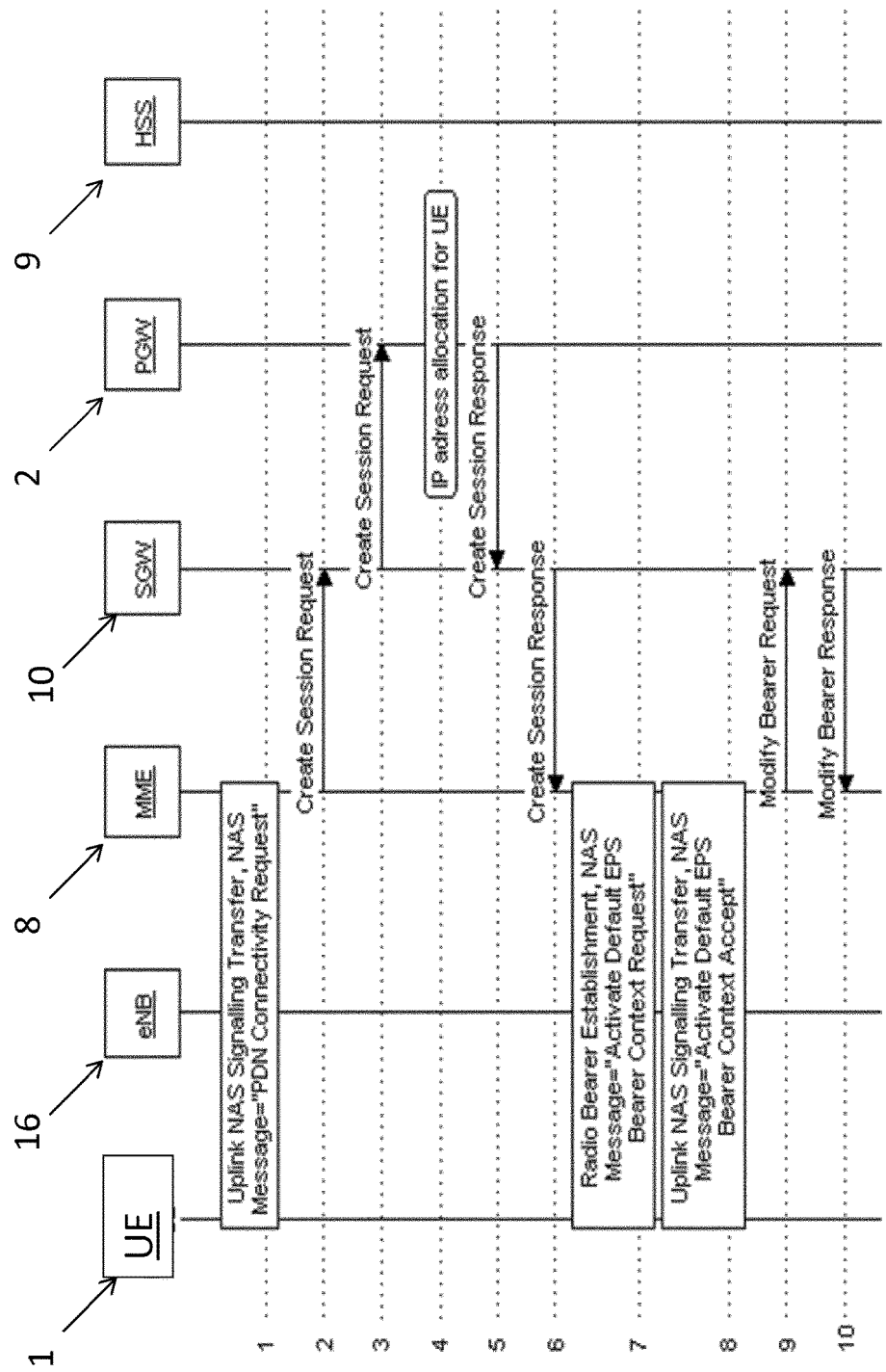
FIG. 6 shows a flowchart of simplified version of the UE Requested PDN Connection sequence from 3GPP TS 23.401.

FIG. 6 is a simplified version of the UE Requested PDN Connection sequence from 3GPP TS 23.401.

All steps are known as such from the 3GPP Standard and will therefore not be explained in detail. However, as been described before as well as below, the step of communicating the cause code indicating that only the assigned PDN and internet protocol version is allowed differs from the known standard and has the previously stated advantages.

The flow chart in FIG. 5 and the subsequent events in FIG. 6 intend to shows the expected behavior if the step of communicating the cause code indicating that only the assigned PDN and internet protocol version is allowed is not deployed.

With reference to FIG. 5:

The UE shall, according to 3GPP, request a dual stack PDN connection if the UE is IPv4 and IPv6 capable or the capabilities are unknown.

Step 1: UE attach request to eNB. Requesting PDN type IPv4v6, i.e. dual stack.
Step 2: eNB attach request to MME
Step 3: Authentication security process involving UE and HSS
Step 4: Update location involving MME and HSS
Step 5: MME create session request to SGW
Step 6: SGW create session request to PGW
Step 7: IP dress allocation for UE with the gateway, PGW
Step 8: PGW create session response to SGW including UE IP address and GTP Cause code. Cause code #18 "New PDN Type due to network preference"
Step 9: SGW create session response to MME including UE IP address and GTP Cause code
Step 10: Mapping GTP cause code to Evolved Session Management (ESM) Cause Code within MME. To either #51 "PDN Type IPv6 only allowed" or #50 "PDN type IPv4 only allowed". The actual NAS cause sent to the UE/MS depends on the allocated IP address type.
Step 11: Initial Radio Bearer Establishment NAS Message "Attach Accept" involving eNB, UE and MME
Step 12: Uplink NAS signaling Transfer, NAS message "Attach Completet" involving eNB, UE and MME
Step 13: MME Modify Bearer request to SGW
Step 14: SGW Modify Bearer Response The output is that operator has only assigned one PDN connection with only one IP address, which is wanted in e.g. machine to machine or walled garden scenarios such as VoLTE.

The APN must be configured to allow single stack IPv4 and single stack IPv6 addresses, since it is unknown in the PGW if the UE will request IPv4 or IPv6 or IPv4v6 addresses. IPv4v6 is not possible on the APN as that would result in a dual stack bearer.

Existing standard say that in this case the PGW shall respond in the Create Session Response (Step 8), with the GTP Cause Code "New PDN due to single address bearer only", that is later fed back to the UE in ESM cause code "Single address bearer only" in the attach accept message sent from MME in step 11. The UE will then initiate a UE initiated PDN connection to retrieve the missing IP address in another PDN connection to the same APN as shown in FIG. 6 steps 1-10.

With the claimed method, the PGW operator use a cause code indicating that only the assigned PDN and internet protocol version is allowed. In FIG. 5 the cause code used is GTP cause code "New PDN due to network preferences" in step 8. The IP type assigned in step 7 depends on operator preferences if the UE requests a dual stack PDN connection. For example, IPv6 will be handed out first and IPv4 only if the UE does not support IPv6. The GTP cause code will be fed back to the UE in ESM cause code "PDN Type IPv4 only allowed" or "PDN Type IPv6 only allowed" in the attach accept message sent by MME in step 11. The MME does this mapping in step 10 depending on which IP type that was received in the create session response in step 9. With this cause code the UE will not try to retrieve the missing IP address in another PDN connection to the same APN as in the flowchart in FIG. 6 steps 1-10.

The selection of which cause code to send from the PDN-GW for a IPv4 single stack and IPv6 single" stack APN may be configurable based on operator decisions. Eg per APN, per IP addresses configured for the APN, received from other system, based on IMSI or other criteria.

The method may also be used for dual stack APN, where the MME does not set the dual address bearer flag, to limit the number of PDN connections for a UE to this APN.

FIGS. 5 and 6 show the initial attach sequence, but the principles for the claimed method is also applicable for a UE initiated PDN connection to a new APN, where there might be a need to restrict the number of IP addresses given to a UE.

With reference to FIG. 6:

Step 1: UE Uplink NAS Signaling Transfer, NAS Message="PDN Connectivity request" involving eNB and MME Step 2: MME Create Session Request to SGW Step 3: SGW Create Session Request to PGW Step 4: IP address allocation for UE with the PGW Step 5: PGW Create Session Response to SGW. Cause code #18 "New PDN Type due to network preference"

Step 6: SGW Create Session Response to MME. MME maps the GTP cause code to NAS cause code: To either #51 "PDN Type IPv6 only allowed" or #50 "PDN type IPv4 only allowed". The actual NAS cause sent to the UE/MS depends on the allocated IP address type.

Step 7: Radio Bearer Establishment, NAS Message="Activate default EPS Bearer Context Request" involving UE, eNB and MME Step 8: Uplink NAS Signalling Transfer, NAS Message="Activate default EPS Bearer Context Accepted" involving UE, eNB and MME Step 9: MME Modify Bearer Request to SGW Step 10: SGW Modify Bearer Response to MME The step S1 of requesting a PDN connectivity has been shown in FIG. 5 as an attach request.

According to another aspect, the step S1 of requesting a PDN connectivity can be done during a PDN connectivity request, which is shown in FIGS. 7 and 8 for two different 3GPP systems.

FIG. 7 schematically shows a flowchart for a PDP Context process in an EPS comprising the step of the gateway, PGW, 2 allocating an IP address for the UE. The process is known in 3GPP as such, but the step of giving the UE the cause code indicating that only the assigned PDN and internet protocol version is allowed is no known. In FIG. 7 BSS/RAN refers to the radio link corresponding to eNB 16.

With reference to FIG. 7:

Step 1: UE Activate PDP Context request to SGSN

Step 2: SGSN Create Session Request to SGW

Step 3: SGW Create Session Request PGW

Step 4: IP address Allocation for UE with the PGW

Step 5: PGW create session response to SGW including UE IP address and GTP Cause code. Cause code #18 "New PDN Type due to network preference"

Step 6: SGW create session response to SGSN including UE IP address and GTP Cause code Step 7: SGSN Modify Bearer Request to SGW Step 8: SGW Modify Bearer Response to SGSN Step 9: Mapping GTP cause code to SM Cause Code within SGSN. S4-SGSN maps the GTP cause code to NAS cause code: To either #51 "PDN Type IPv6 only allowed" or #50 "PDN type IPv4 only allowed". The actual NAS cause sent to the UE/MS depends on the allocated IP address type.

Step 10: SGSN Activate PDP Context Accept to UE

FIG. 8 schematically shows a known flowchart for a PDP Context process in GPRS comprising the step of the gateway, GGSN, 2 allocating an IP address for the UE. The process is known in 3GPP as such, but the step of giving the UE the cause code indicating that only the assigned PDN and internet protocol version is allowed is no known. In FIG. 8 the gateway is a GGSN. However, the PGW can use a Gn interface to communicate with the SGSN.

With reference to FIG. 8:

Step 1: UE Activate PDP Context request to SGSN

Step 2: SGSN Create PDP Context Request to GGSN

Step 3: IP address Allocation for UE with the GGSN

Step 4: GGSN Create PDP Context Response to SGSN including UE IP address and GTP Cause code. #129 "New PDP Type due to network preference"

Step 5: SGSN Update PDP Context Request to GGSN

Step 6: GGSN Update PDP Context Response to SGSN

Step 7: Mapping GTP cause code to SM Cause Code within SGSN. SGSN maps the GTP cause code to NAS cause code: To either #51 "PDN Type IPv6 only allowed" or #50 "PDN type IPv4 only allowed". The actual NAS cause sent to the UE depends on the allocated IP address type.

Step 8: SGSN Activate PDP Context Accept to UE

The invention claimed is:

1. A method performed in a user equipment (UE) for data communication in a 3GPP network via an access point name (APN) capable of providing support for packet data network (PDN) connectivity, the method comprising the steps of:
    requesting dual stack PDN connectivity from a gateway, wherein the gateway is configured to support both Internet Protocol (IP) version 4 (IPv4) and IP version 6 (IPv6) and the gateway is further configured to use single address bearers only; and
    in response to the request for dual stack PDN connectivity:
    receiving a single IP address, wherein the received IP address is one of: i) an IPv4 address and ii) an IPv6 address; and
    receiving, from the gateway configured to support both IPv4 and IPv6, a cause code indicating one of: i) that only PDN type IPv4 is allowed for the requested PDN connectivity and ii) that only PDN type IPv6 is allowed for the requested PDN connectivity;
    wherein the UE responds to the cause code by refraining from requesting a second IP address in addition to the received single IP address.

2. The method according to claim 1, further comprising the step of:
    requesting dual stack PDN connectivity from the gateway during an attach procedure.

3. The method according to claim 1, further comprising the step of:
    requesting dual stack PDN connectivity from the gateway during a UE requested PDN connectivity procedure.

4. The method according to claim 1, further comprising the step of:
    requesting dual stack PDN connectivity from the gateway during a UE requested PDP context activation procedure.

5. The method according to claim 1, further comprising:
storing the cause code in the UE.

6. A method, the method comprising the steps of:
receiving, at a gateway, a request for dual stack packet data network (PDN) connectivity for a user equipment (UE), wherein the gateway is configured to support both Internet Protocol (IP) version 4 (IPv4) and IP version 6 (IPv6) and the gateway is further configured to use single address bearers only;
checking protocol for IP address allocation;
selecting a single IP address based on the protocol for IP address allocation, wherein the selected IP address is one of: i) an IPv4 address and ii) an IPv6 address;
sending the selected single IP address to the UE; and
the gateway, which is configured to support both IPv4 and IPv6, causing a network node to send to the UE a cause code indicating one of: i) that only PDN type IPv4 is allowed for the requested PDN connectivity and ii) that only PDN type IPv6 is allowed for the requested PDN connectivity;
wherein sending the cause code to the UE causes the UE to refrain from requesting a second IP address in addition to the selected single IP address.

7. The method according to claim 6, wherein the step of checking protocol for IP address allocation further comprises the step of:
collecting protocol information from a network regarding the UE.

8. The method according to claim 6, wherein the step of checking protocol for IP address allocation further comprises the step of:
collecting protocol information from an operator or service provider regarding the UE.

9. The method according to claim 6, further comprising the step of:
receiving a request for dual stack PDN connectivity from the UE during a UE requested attach procedure.

10. The method according to claim 6, further comprising the step of:
receiving a request for dual stack PDN connectivity from the UE during a UE requested PDN connectivity procedure.

11. The method according to claim 6, further comprising the step of:
receiving a request for dual stack PDN connectivity from the UE during a UE requested PDP context activation procedure.

12. The method according to claim 6, wherein the method is performed in a general packet radio service (GPRS) system wherein the gateway being a gateway GPRS support node (GGSN) or in a evolved packet system (EPS) wherein the gateway is a packet data network gateway (PGW).

13. A user equipment (UE) for data communication in a 3GPP network via an access point name (APN) capable of providing support for packet data network (PDN) connectivity, the user equipment comprising:
a memory; and
a processing unit comprising one or more processors, wherein the UE is configured to:
request dual stack PDN connectivity from a gateway, wherein the gateway is configured to support both Internet Protocol (IP) version 4 (IPv4) and IP version 6 (IPv6) and the gateway is further configured to use single address bearers only; and
in response to the request for dual stack PDN connectivity:
receive a single IP address, wherein the received IP address is one of: i) an IPv4 address and ii) an IPv6 address; and
receive, from the gateway configured to support both IPv4 and IPv6, a cause code indicating one of: i) that only PDN type IPv4 is allowed for the requested PDN connectivity and ii) that only PDN type IPv6 is allowed for the requested PDN connectivity;
wherein the UE responds to the cause code by refraining from requesting a second IP address in addition to the received single IP address.

14. The UE according to claim 13, wherein the UE is further configured to:
request dual stack PDN connectivity from the gateway during an attach procedure.

15. The UE according to claim 13, wherein the UE is further configured to:
request dual stack PDN connectivity from the gateway during a UE requested PDN connectivity procedure.

16. The UE according to claim 13, wherein the UE is further configured to:
request dual stack PDN connectivity from the gateway during a UE requested PDP context activation procedure.

17. The UE according to claim 13, wherein the memory is configured to store the cause code.

18. A gateway comprising:
a memory; and
a processing unit comprising one or more processors, wherein the gateway is configured to:
receive a request for dual stack packet data network (PDN) for a user equipment (UE), wherein the gateway is configured to support both Internet Protocol (IP) version 4 (IPv4) and IP version 6 (IPv6) and the gateway is further configured to use single address bearers only;
check protocol for IP address allocation;
select a single IP address based on the protocol for IP address allocation, wherein the selected IP address is one of: i) an IPv4 address and ii) an IPv6 address;
send the selected single IP address to the UE; and
cause a network node to send to the UE a cause code indicating one of: i) that only PDN type IPv4 is allowed for the requested PDN connectivity and ii) that only PDN type IPv6 is allowed for the requested PDN connectivity;
wherein sending the cause code to the UE causes the UE to refrain from requesting a second IP address in addition to the selected single IP address.

19. The gateway according to claim 18, wherein the gateway is configured to perform the step of checking protocol for IP address allocation by collecting protocol information from a network regarding the UE.

20. The gateway according to claim 18, wherein the gateway is being configured to perform the step of checking protocol for IP address allocation by collecting protocol information from an operator or service provider regarding the UE.

21. The gateway according to claim 18, wherein the gateway is configured to perform the step of receiving a request for dual stack PDN connectivity from a UE by receiving a request for dual stack PDN connectivity from the UE during a UE requested attach procedure.

22. The gateway according to claim 18, wherein the gateway is configured to perform the step of receiving a request for dual stack PDN connectivity from a UE by receiving a request for dual stack PDN connectivity from the UE during a UE requested PDN connectivity procedure.

23. The gateway according to claim 18, wherein the gateway is configured to perform the step of receiving a request for dual stack PDN connectivity from a UE by receiving a request for dual stack PDN connectivity from the UE during a UE requested PDP context activation procedure.

24. The gateway according to claim 18, wherein the gateway is one of i) configured for use general packet radio service (GPRS) system, the gateway being a gateway GPRS support node (GGSN), or ii) is a packet data network gateway (PGW) in a evolved packet system, (EPS).

* * * * *